(12) United States Patent
Jones

(10) Patent No.: US 6,588,535 B1
(45) Date of Patent: Jul. 8, 2003

(54) VEHICLE FRAME ASSEMBLY

(75) Inventor: Robert Allen Jones, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/713,711

(22) Filed: Nov. 15, 2000

(51) Int. Cl.$^7$ .............................................. B62D 21/02
(52) U.S. Cl. ...................... 180/312; 180/359; 180/378; 280/781; 280/93.515
(58) Field of Search ................................ 180/359, 360, 180/353, 354, 378, 382, 312; 280/796, 797, 798, 799, 800, 781, 93.515

(56) References Cited

U.S. PATENT DOCUMENTS

| | | | |
|---|---|---|---|
| 2,115,931 A | * | 5/1938 | Matthaei ...................... 280/796 |
| 2,816,616 A | * | 12/1957 | Hill .............................. 180/359 |
| 3,074,735 A | | 1/1963 | Ulrich |
| 3,610,067 A | | 10/1971 | Stibbe |
| 4,143,888 A | | 3/1979 | Heinig |
| 4,752,086 A | * | 6/1988 | Hotta et al. .................. 280/792 |
| 4,813,704 A | | 3/1989 | Smith |
| 4,951,964 A | | 8/1990 | Sakamoto et al. |
| 5,181,736 A | * | 1/1993 | Kokubun ..................... 280/796 |
| 5,280,957 A | | 1/1994 | Hentschel et al. |
| 5,641,181 A | | 6/1997 | Galhotra |
| 6,039,351 A | | 3/2000 | Jones et al. |

* cited by examiner

Primary Examiner—Peter C. English
(74) Attorney, Agent, or Firm—Gregory P. Brown

(57) ABSTRACT

A vehicular frame assembly 10 having a pair of members 12, 14 which are generally parallel to the longitudinal axis of symmetry 16 of the vehicle which is constructed by use of the frame assembly 10. Each member 12, 14 is connected by use of members 11, 18, 20, 21, and 13 and has a pair of portions 22, 24 which each have a relatively tall sectional height which include an aperture 28. A unique one of the half shafts 32, 34, 36, and 38 are received within each of these apertures 28, thereby allowing the portions 22, 24 to have a relatively tall sectional height and thereby allowing the frame assembly 10 to have a lowest resonant frequency mode in excess of about fifty hertz.

6 Claims, 2 Drawing Sheets

VEHICLE FRAME ASSEMBLY

FIELD OF THE INVENTION

The present invention generally relates to a vehicle frame assembly and more particularly, to a relatively stiff vehicle frame assembly having a lowest resonant frequency mode in excess of about fifty hertz.

BACKGROUND OF THE INVENTION

A vehicle frame assembly operatively supports and/or is coupled to many required and conventional vehicle components and assemblies such as and without limitation, the power train, the half shafts which cooperatively communicate torque from the power train to the wheels, the steering assembly, and the suspension and/or control arm assemblies.

It is desirable to provide a relatively stiff frame assembly in order to reduce the amount of noise and/or vibrational energy which is generated and communicated into the vehicular passenger compartment. For example, many conventional and "full" vehicular frame assemblies have a lowest resonant frequency mode of about thirteen hertz which may cause undesirable vibrational noise to be generated and communicated into the passenger compartment. Increasing this lowest resonant frequency mode (e.g., by "stiffening" the frame assembly) will reduce the likelihood of such undesirable generation and communication of vibrational noise into the vehicle.

While a frame assembly may be "stiffened" by selectively increasing the sectional height of the frame assembly, this approach is not typically utilized due to the required placement of some of these previously delineated assemblies upon or underneath the frame assembly and the concomitant clearance required between the frame assembly and the ground upon which the vehicle is driven and/or between the vehicular components and the ground upon which the vehicle is driven. Further, while the frame assembly may be "stiffened" by increasing its width (e.g., increasing the size of the frame assembly in a direction which is substantially perpendicular to the longitudinal axis of the vehicle), this approach is also not typically utilized due to the desirability of providing a relatively long wheel control arm and due to the conventional placement of the power train assembly in close proximity to the frame assembly.

SUMMARY OF THE INVENTION

It is a first non-limiting advantage of the present invention to provide a relatively stiff vehicular frame assembly.

It is a second non-limiting advantage of the present invention to provide a relatively stiff vehicular frame assembly having a relatively tall sectional height and which concomitantly provides the required clearance between various vehicular assemblies and components and the ground upon which the vehicle is driven.

It is a third non-limiting advantage of the present invention to provide a relatively stiff vehicular frame assembly having a lowest resonant mode which occurs at a frequency which is greater than about twenty hertz.

It is a fourth non-limiting advantage of the present invention to provide a relatively stiff front vehicular frame assembly which has a lowest resonant frequency mode which occurs at a frequency which is greater than about one-hundred hertz.

According to a first aspect of the present invention, a vehicular frame assembly is provided for use with a vehicle having a pair of front half shafts and a pair of rear half shafts. The vehicular frame assembly has first and second members which are substantially parallel to the longitudinal axis of the vehicle and third and fourth members which are perpendicular to the longitudinal axis of the vehicle and which are coupled to the first and second members, the first member having a first tall sectional height portion with a first aperture and a second tall sectional height portion with a second aperture and the second member having a third tall sectional height portion with a third aperture and a fourth tall sectional height portion with a fourth aperture, the first and third apertures being aligned and respectively receiving a unique one of the front vehicular half-shafts and the second and fourth apertures being aligned and respectively receiving a unique one of the rear vehicular half-shafts.

According to a second aspect of the present invention, a method is provided to provide a stiff vehicular frame assembly. The method comprises the steps of forming a pair of members, each of the members having a portion having a relatively tall sectional height; forming an aperture within each of the portions; and coupling a first of the pair of members to a second of the pair of members, thereby forming a stiff vehicular frame assembly.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
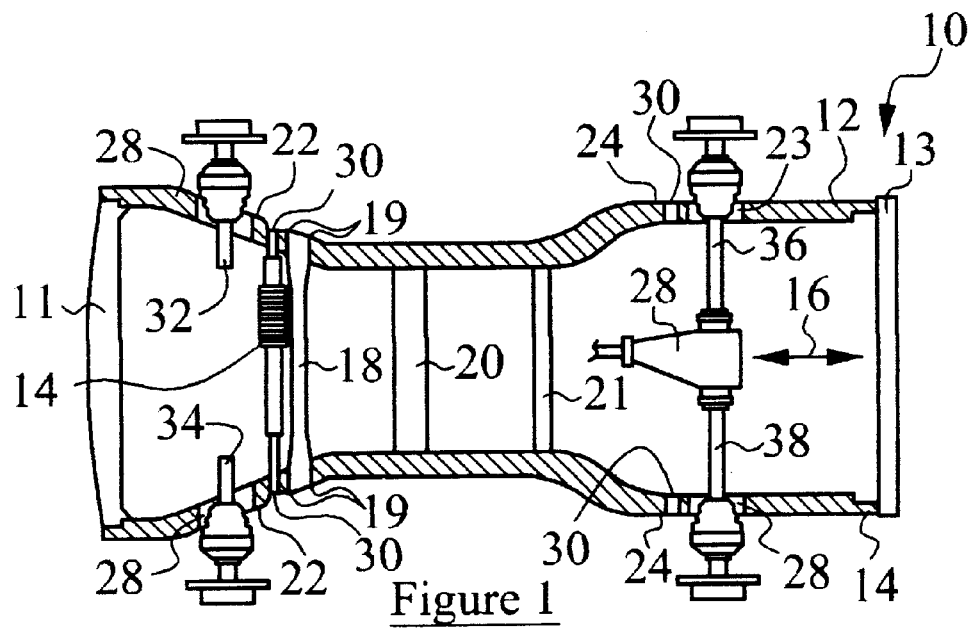
FIG. 1 is a plan view of a vehicular frame assembly which is made in accordance with the teachings of the preferred embodiment of the invention.

Referring now to FIG. 1, there is shown a vehicular frame assembly 10 (e.g., a "full frame") which is made in accordance with the teachings of the preferred embodiment of the invention. As shown, vehicular frame assembly 10 includes a pair of substantially identical members 12, 14 which are generally parallel to the axis 16 which generally corresponds to the longitudinal axis of the vehicle which is formed and/or constructed by the use of the frame assembly 10.

Assembly 10 further includes members 11, 13, 18, 20, 21 which are generally perpendicularly coupled to the members 12, 14 and which are generally perpendicular to the axis 16. It should be realized that the present invention is applicable to a wide variety of vehicular frame assemblies and should not and is not to be limited to the exact frame assembly 10 which is shown in FIG. 1 and/or to the exact shape or geometric orientation of the members 11, 12, 13, 14, 18, 20, or 21 and that these other vehicular frame assemblies may have only one or two "perpendicularly coupled" members, such as members 11, 13, 18, 20, or 21, or more than five such members. In one non-limiting embodiment, member 18 may perforate members 12, 14 and be coupled to the members 12, 14 by the use of welded connections 19, thereby further "stiffening" the frame assembly 10.

Figure 2:
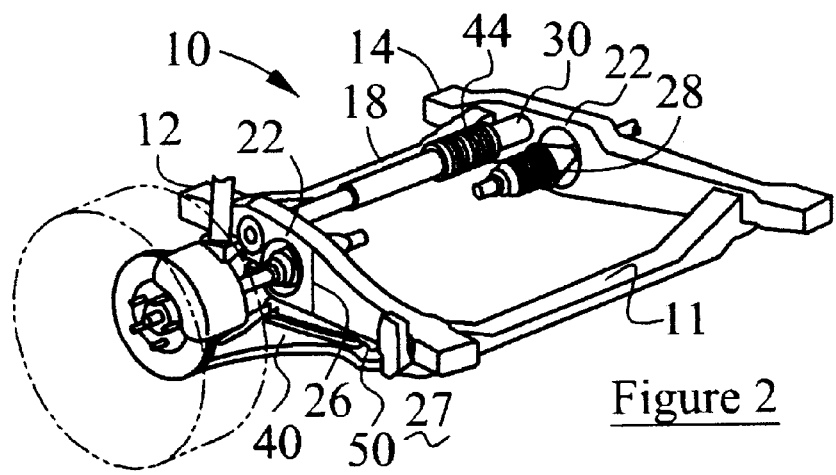
FIG. 2 is a perspective view of the front portion of the frame assembly which is shown in FIG. 1.

As shown best in FIGS. 1 and 2, each of the members 12, 14 has a substantially identical pair of relatively tall sectional portions 22, 24 which, in one non-limiting embodiment of the invention, have a respective maximum height 26 which is about two to about four times taller than the shortest height of any other portion of any of the members 22, 24. Each portion 22, 24 of each member, 12, 14 therefore has a relatively tall sectional height. Further, each portion 22, 24 of each member 12, 14 includes an aperture 28 and, in one non-limiting embodiment of the invention, each portion 22, 24 includes an aperture 30. An aperture 30 may be placed or formed on either side of an aperture 28.

Particularly, aperture 28 of portion 22 of member 12 is aligned with aperture 28 of portion 22 of member 14 and aperture 30 of portion 22 of member 12 is aligned with aperture 30 of portion 22 of member 14. Further, aperture 28 of portion 24 of member 12 is aligned with aperture 28 of portion 24 of member 14. In one non-limiting embodiment, only one of the portions 22 or only one of the portions 24 includes an aperture 30. In another non-limiting embodiment the apertures 28 and 30 are substantially identical. Members 12, 14, 11, 13, 18, 20, and 21 therefore cooperatively form a "full vehicular frame assembly."

The relatively tall sectional height of each portion 22, 24 stiffens the members 12, 14 and causes the entire frame assembly 10 to have a lowest resonant frequency which is greater than about twenty hertz. Particularly, this tall sectional height is operatively achieved by allowing and/or causing the aligned apertures 28 of portions 22 to respectively receive the front vehicular half shafts 32, 34 and to allow the aligned apertures 28 of portions 24 to respectively receive the rear vehicular half shafts 36, 38, thereby obviating the need for the half shafts 32, 34, 36, and 38 to be placed "on top of" the frame assembly 10 or underneath of the frame assembly 10 and allowing the sectional height of portions 22, 24 to be relatively tall (e.g., in one non-limiting embodiment height 26 is about 100 to 250 mm). Moreover, such an increase in sectional height is achieved by concomitantly maintaining the desired clearance between the frame assembly 10 and the ground 27 and/or between the vehicular components, such as differential or powertrain assembly 29, and the ground 27. Moreover, such stiffness is desirably achieved without increasing the width of the members 12, 14 (e.g., without increasing the size of the members 12, 14 along a direction which is generally perpendicular to the axis 16), thereby allowing for the desirable use of a relatively long control arm 40 on each of the members 12, 14.

Figure 3:
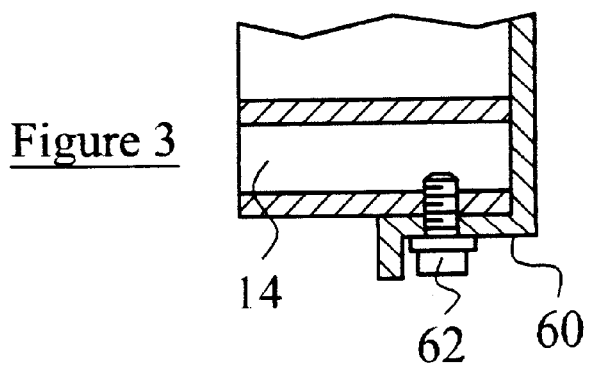
FIG. 3 is a sectional view illustrating the coupling of the frame assembly shown in FIG. 1 to the body of the vehicle.

Further, steering assembly 44 may be operatively positioned underneath the frame assembly 10 or may be received, in one non-limiting embodiment of the invention, within apertures, such as apertures 30. Further, each of the control arms 40 may be connected to a unique one of the members 12, 14 by the use of bushings or other rotatable connection member. Further, as shown best in FIG. 3, members 12, 14 may be coupled to the body 60 of the vehicle by the use of bushings or rubber isolator members 62.

Figure 4:
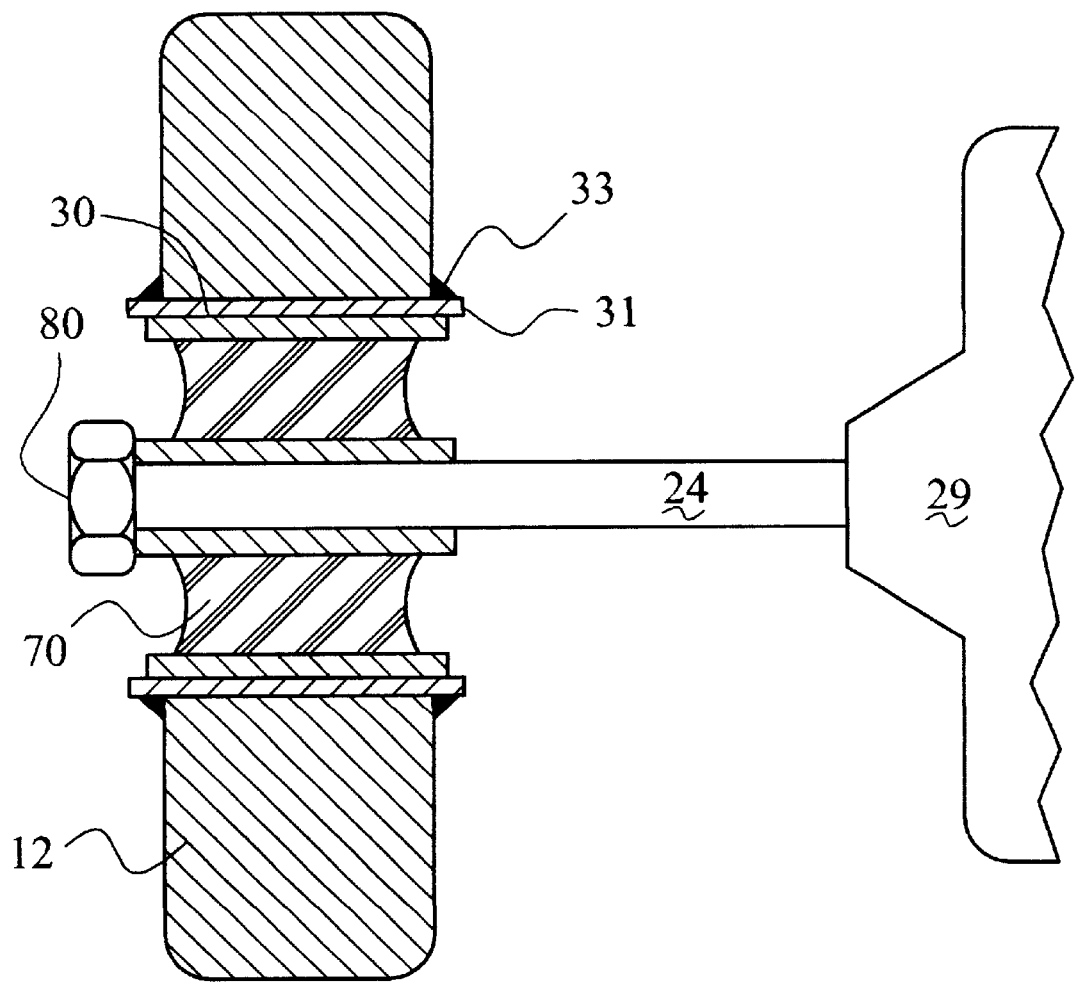
FIG. 4 is a sectional view illustrating the coupling of the frame assembly shown in FIG. 1 to the power train of the vehicle.

As best shown in FIG. 4, apertures 30 of members 12, 14 may be used to securely couple the frame assembly 10 to various vehicle components (i.e., the power train 29) through the use of bushing assemblies 70 and bolts or other attachment members 80 which may be selectively and operatively attached to these components through these apertures 30 and/or through assemblies 70. In one non-limiting embodiment of the invention, each aperture 30 may be selectively "reinforced" (e.g., respectively forming a "reinforcing aperture") by receiving a tube 31 which is "held within" an aperture 30 by welded connections 33. An aperture 30 may alternatively have its edges "rolled" or flared into the interior of the aperture 30 or alternatively an aperture 30 may have its edges rolled and flared in combination with the receipt of a reinforcing member, such as member 31. A bushing assembly 70 may be selectively "press fit" and frictionally secured within a reinforcement member 31.

Moreover, it should be appreciated that in another alternate embodiment of the invention, the front vehicular frame assembly, which is shown in FIG. 2 has a lowest resonant frequency in excess of about 100 hertz and may be employed in a unitized body arrangement which allows for the lowest resonant frequency, of the resulting arrangement or frame assembly, to be greater than about ninety hertz. The use of such a front frame assembly, in front wheel drive vehicles, therefore greatly enhances the overall "smoothness" of the ride of the vehicle.

It is to be understood that the invention is not limited to the exact construction and embodiment which has been illustrated and described above but that various changes and modifications may be made without departing from the spirit and the scope of the inventions as described in the following claims.

What is claimed is:

1. A vehicular frame assembly for use with a vehicle having a longitudinal axis of symmetry, a pair of front half shafts, a pair of rear half shafts, and a steering assembly, said vehicular frame assembly comprising:

a pair of substantially identical frame members each having front and rear tall sectional height portions and a shortest portion having a certain height, wherein each of said front tall sectional height portions has a first aperture and a second aperture and each of said rear tall sectional height portions has a third aperture, said pair of frame members are generally parallel to said longitudinal axis of symmetry of said vehicle and said front and rear tall sectional height portions are two to four times taller in height than said shortest portion, said pair of frame members causing said vehicular frame assembly to have a lowest resonant frequency greater than about twenty hertz;

wherein a unique one of said pair of front half shafts is disposed through a unique one of said first apertures, a unique one of said rear half shafts is disposed through a unique one of said third apertures, and said steering assembly is disposed through said second apertures.

2. The vehicular frame assembly of claim 1 wherein each of said front and rear tall sectional height portions are between 100 millimeters and 250 millimeters in height.

3. The vehicular frame assembly of claim 2 further comprising at least one member which is generally perpendicular to said longitudinal axis of symmetry and is coupled to each of said pair of frame members.

4. The vehicular frame assembly of claim 3 wherein said at least one member perforates said pair of frame members.

5. A vehicular front frame assembly comprising:

a first member having a first portion and a second portion, said first portion having first and second apertures and a sectional height which is between 100 millimeters and 250 millimeters and which is at least two times taller than the height of said second portion;

a second member having a third portion and a fourth portion, said third portion having third and fourth apertures and a sectional height which is between 100 millimeters and 250 millimeters and which is at least two times taller than the height of said fourth portion; and at least one third member which is generally perpendicularly coupled to said first and second members, wherein said first member, said second member, and said at least one third member cooperatively cause said vehicular front frame assembly to have a lowest resonant frequency which is greater than about one-hundred hertz; wherein said first member and said second member are substantially identical and said first aperture and said third aperture are substantially aligned and respectively receive a unique vehicular half shaft and wherein said second aperture and said fourth aperture are substantially aligned and receive a vehicular steering assembly.

6. A method for providing a stiff vehicular frame assembly, said method comprising the steps of:

forming a pair of substantially identical frame members, each having a front tall sectional height portion and a rear tall sectional height portion, wherein said tall sectional height portions each have the same height which is between 100 millimeters and 250 millimeters;

forming at least one aperture within each of said tall sectional height portions, including forming a first aperture and a second aperture within each of said front tall sectional height portions, effective to permit vehicular components to be disposed within said apertures;

aligning corresponding ones of said apertures formed within each of said tall sectional height portions of said frame members;

coupling said pair of frame members together, wherein said tall sectional height portions are effective to cause said vehicular frame assembly to have a lowest resonant frequency greater than twenty hertz;

providing a first pair of vehicular half shafts and a second pair of vehicular half shafts;

disposing said first pair of vehicular half shafts within said first apertures formed within said front tall sectional height portions;

disposing a unique one of said second pair of vehicular half shafts within a unique one of said apertures formed within said rear tall sectional height portions;

providing a vehicular steering assembly; and disposing said vehicular steering assembly within said second apertures.

* * * * *